(12) United States Patent
Sakurai et al.

(10) Patent No.: US 10,606,745 B2
(45) Date of Patent: Mar. 31, 2020

(54) MEMORY SYSTEM

(71) Applicant: Toshiba Memory Corporation, Minato-ku (JP)

(72) Inventors: Seiichiro Sakurai, Yokohama (JP); Naoto Oshiyama, Tokyo (JP); Hiroyasu Nakatsuka, Machida (JP)

(73) Assignee: Toshiba Memory Corporation, Minato-ku (JP)

( * ) Notice: Subject to any disclaimer, the term of this patent is extended or adjusted under 35 U.S.C. 154(b) by 75 days.

(21) Appl. No.: 15/916,385

(22) Filed: Mar. 9, 2018

(65) Prior Publication Data

US 2019/0087325 A1     Mar. 21, 2019

(30) Foreign Application Priority Data

Sep. 20, 2017  (JP) ................. 2017-180460

(51) Int. Cl.
 *G06F 12/02* (2006.01)
 *G06F 12/1009* (2016.01)
 *G06F 3/06* (2006.01)

(52) U.S. Cl.
 CPC .......... *G06F 12/0246* (2013.01); *G06F 3/061* (2013.01); *G06F 3/064* (2013.01); *G06F 3/0679* (2013.01); *G06F 12/1009* (2013.01); *G06F 2212/7201* (2013.01); *G06F 2212/7206* (2013.01)

(58) Field of Classification Search
 CPC ............. G06F 12/0292; G06F 12/0246; G06F 2212/7201
 See application file for complete search history.

(56) References Cited

U.S. PATENT DOCUMENTS

| | | | |
|---|---|---|---|
| 6,377,500 B1* | 4/2002 | Fujimoto | G06F 12/0246 365/230.01 |
| 2009/0267128 A1 | 10/2009 | Maejima | |
| 2009/0268522 A1 | 10/2009 | Maejima | |
| 2010/0207195 A1 | 8/2010 | Fukuzumi et al. | |
| 2010/0214838 A1 | 8/2010 | Hishida et al. | |
| 2011/0199825 A1 | 8/2011 | Han et al. | |
| 2011/0284946 A1 | 11/2011 | Kiyotoshi | |
| 2012/0069663 A1 | 3/2012 | Itagaki et al. | |
| 2012/0215965 A1* | 8/2012 | Inada | G06F 12/0246 711/103 |
| 2012/0307557 A1 | 12/2012 | Itagaki | |
| 2013/0198439 A1* | 8/2013 | Kurotsuchi | G06F 12/0246 711/103 |
| 2013/0246689 A1 | 9/2013 | Matsudaira et al. | |
| 2013/0346675 A1* | 12/2013 | Yeh | G06F 12/0246 711/103 |
| 2016/0328154 A1 | 11/2016 | Mizushima et al. | |

(Continued)

*Primary Examiner* — Edward J Dudek, Jr.
(74) *Attorney, Agent, or Firm* — Oblon, McClelland, Maier & Neustadt, L.L.P.

(57) ABSTRACT

According to one embodiment, a memory system, comprises a non-volatile memory; a first memory and a second memory; and a memory controller configured to receive a first logical address from a host in a first reading, read a first address conversion table corresponding to the first logical address from the non-volatile memory, and store, in the non-volatile memory, a second address conversion table of a first state stored in the first memory in a case where the first logical address corresponds to a second logical address stored in the second memory.

6 Claims, 17 Drawing Sheets

(56) References Cited

U.S. PATENT DOCUMENTS

| | | | |
|---|---|---|---|
| 2018/0275873 A1* | 9/2018 | Frid | G06F 3/061 |
| 2018/0349287 A1* | 12/2018 | Kan | G06F 12/1009 |
| 2019/0004944 A1* | 1/2019 | Widder | G06F 12/0292 |
| 2019/0057038 A1* | 2/2019 | Haswell | G06F 12/10 |
| 2019/0205257 A1* | 7/2019 | Kim | G06F 12/10 |

\* cited by examiner

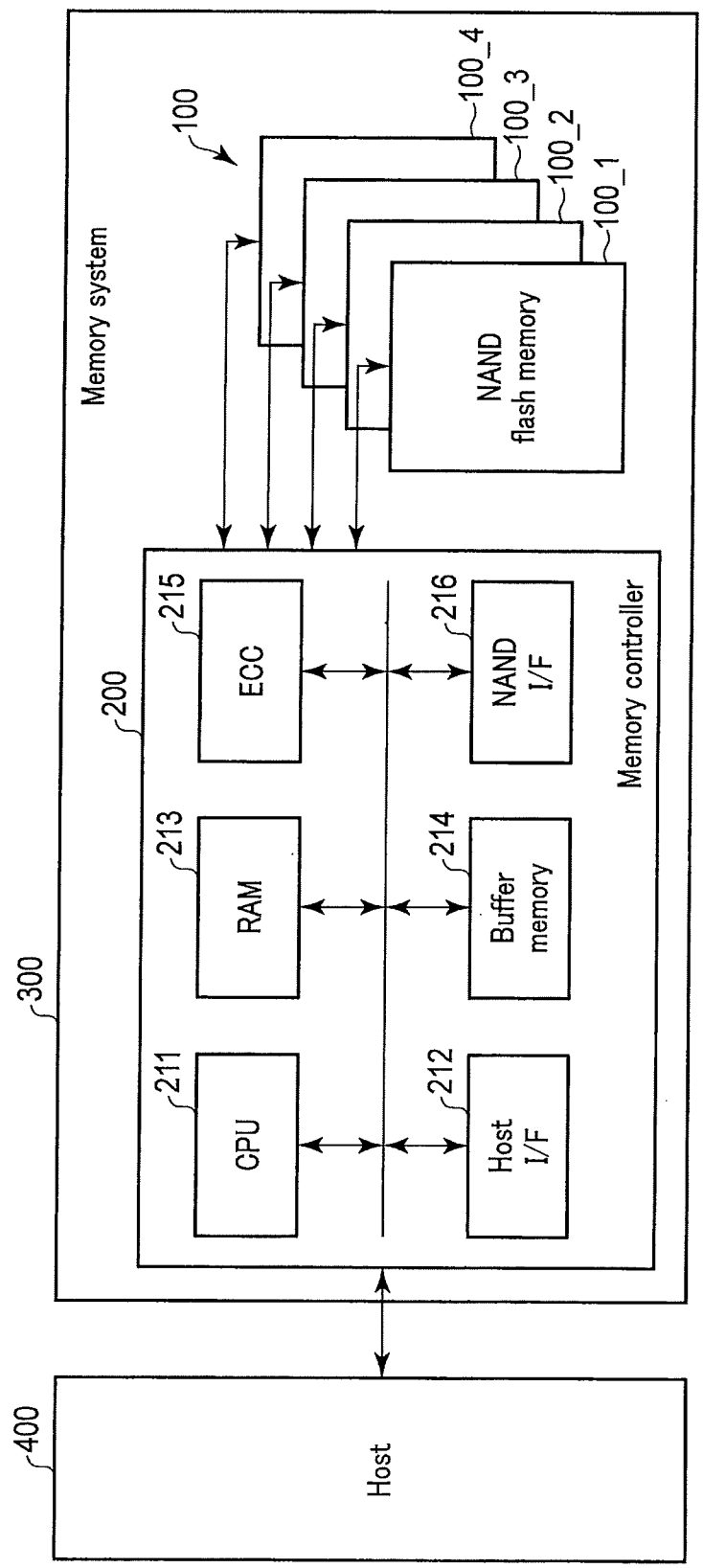
F I G. 1

| Logical address | Physical address | 124 |
|---|---|---|
| 0x00000000 | CHIP=1, BLOCK=0, WL=1, OFFSET=3 | |
| 0x00000001 | CHIP=0, BLOCK=0, WL=0, OFFSET=1 | |
| 0x00000002 | CHIP=0, BLOCK=0, WL=0, OFFSET=2 | |
| 0x00000003 | CHIP=1, BLOCK=0, WL=2, OFFSET=0 | |
| ⋮ | ⋮ | |
| 0x00010000 | CHIP=2, BLOCK=5, WL=0, OFFSET=0 | |
| 0x00010001 | CHIP=1, BLOCK=0, WL=2, OFFSET=1 | |
| 0x00010002 | CHIP=2, BLOCK=5, WL=0, OFFSET=1 | |
| 0x00010003 | CHIP=1, BLOCK=0, WL=2, OFFSET=2 | |
| ⋮ | ⋮ | |
F I G. 4
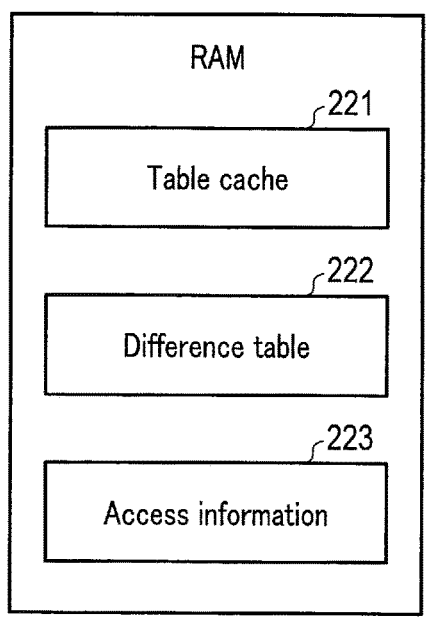
F I G. 5

221

| Logical address | Physical address |
|---|---|
| 0x00000000 | CHIP=1, BLOCK=0, WL=1, OFFSET=3 |
| 0x00000001 | CHIP=0, BLOCK=0, WL=0, OFFSET=1 |
| 0x00000002 | CHIP=0, BLOCK=0, WL=0, OFFSET=2 |
| 0x00000003 | CHIP=1, BLOCK=0, WL=2, OFFSET=0 |
| ⋮ | ⋮ |

F I G. 6

221

| Line number | Line head logical address | CLEAN/DIRTY | Ejection priority |
|---|---|---|---|
| 0x0000 | 0x00000000 | CLEAN | 2 |
| 0x0001 | 0x0000ab80 | DIRTY | 1 |
| 0x0002 | 0x00001280 | CLEAN | 3 |
| 0x0003 | 0x00001200 | CLEAN | 4 |
| ⋮ | ⋮ | | |
| 0x1000 | 0x00010000 | CLEAN | 0 |
| ⋮ | ⋮ | | |

F I G. 7

222

| Logical address | Physical address |
| --- | --- |
| 0x00000000 | CHIP=0, BLOCK=0, WL=0, OFFSET=1 |
| 0x00000001 | CHIP=0, BLOCK=0, WL=0, OFFSET=2 |
| 0x00000002 | CHIP=1, BLOCK=0, WL=1, OFFSET=3 |
| 0x00000003 | CHIP=1, BLOCK=0, WL=1, OFFSET=0 |

F I G. 8

223

| Line head logical address |
| --- |
| 0x00002000 |
| 0x00003000 |

F I G. 9

Reading of 0x00003200

Table cache

| Line number | Line head logical address | CLEAN/DIRTY | Ejection priority |
|---|---|---|---|
| 0x0000 | 0x00003200 | CLEAN | 4 |
| 0x0001 | 0x0000ab80 | DIRTY | 0 |
| 0x0002 | 0x00001280 | CLEAN | 1 |
| 0x0003 | 0x00001200 | CLEAN | 2 |
| ... | ... | ... | ... |
| 0x1000 | 0x00010000 | CLEAN | 3 |
| ... | ... | ... | ... |

Read from NAND ↑ (pointing to line 0x0000)

Access information

| Line head logical address |
|---|
| 0x00020000 |
| 0x00000000 |

FIG. 13

Reading of 0x00020000

| Line number | Line head logical address | CLEAN/DIRTY | Ejection priority |
|---|---|---|---|
| 0x0000 | 0x00000000 | CLEAN | 1 |
| 0x0001 | 0x0000ab80 | DIRTY | 0 |
| 0x0002 | 0x00001280 | CLEAN | 2 |
| 0x0003 | 0x00001200 | CLEAN | 3 |
| ... | ... | ... | ... |
| 0x1000 | 0x00010000 | CLEAN | 4 |
| ... | ... | ... | ... |

Table cache

Non-volatilization to NAND

Access information

Line head logical address: 0x00020000

FIG. 14

Reading of 0x0002000

Table cache

| Line number | Line head logical address | CLEAN/DIRTY | Ejection priority |
|---|---|---|---|
| 0x0000 | 0x00000000 | CLEAN | 0 |
| 0x0001 | 0x00020000 | CLEAN | 4 |
| 0x0002 | 0x00001280 | CLEAN | 1 |
| 0x0003 | 0x00001200 | CLEAN | 2 |
| ... | ... | ... | ... |
| 0x1000 | 0x00010000 | CLEAN | 3 |
| ... | ... | ... | ... |

↑ Read from NAND

Access information

| Line head logical address |
|---|
| 0x00020000 |

FIG. 15

MEMORY SYSTEM

CROSS-REFERENCE TO RELATED APPLICATION

This application is based upon and claims the benefit of priority from the prior Japanese Patent Application No. 2017-180460, filed Sep. 20, 2017, the entire contents of which are incorporated herein by reference.

FIELD

Embodiments described herein relate generally to a memory system.

BACKGROUND

A memory system which includes a NAND flash memory and a memory controller to control the NAND flash memory has been proposed.

BRIEF DESCRIPTION OF THE DRAWINGS

FIG. 1 is a block diagram illustrating a memory system according to a first embodiment;

FIG. 4 is a diagram illustrating a logical-physical conversion table in the NAND flash memory of the memory system according to the first embodiment;

FIG. 5 is a block diagram illustrating contents stored in a built-in memory of the memory system according to the first embodiment;

FIG. 6 is a diagram illustrating an example of the logical-physical conversion table in a table cache of the memory system according to the first embodiment;

FIG. 7 is a diagram illustrating an example of information of each line in the table cache of the memory system according to the first embodiment;

FIG. 8 is a diagram illustrating an example of a difference table of the memory system according to the first embodiment;

FIG. 9 is a diagram illustrating an example of access information of the memory system according to the first embodiment;

FIGS. 12 and 13 are diagrams illustrating a first example of the reading in the memory system according to the first embodiment;

FIGS. 14 and 15 are diagrams illustrating a second example of the reading in the memory system according to the first embodiment;

DETAILED DESCRIPTION

Figure 2:
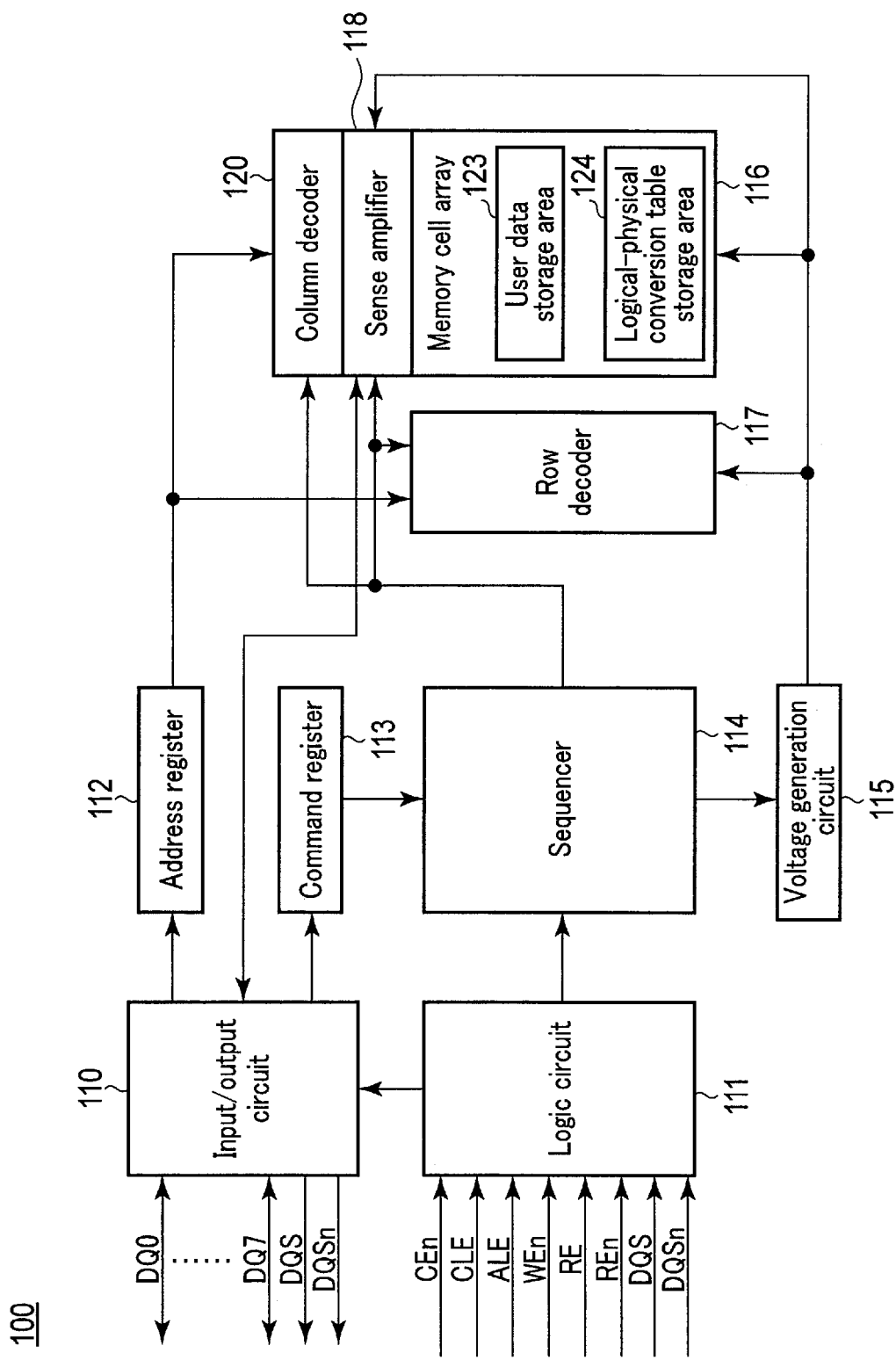
FIG. 2 is a block diagram illustrating a NAND flash memory of the memory system according to the first embodiment.

In general, according to one embodiment, a memory system, includes a non-volatile memory; a first memory and a second memory; and a memory controller configured to receive a first logical address from a host in a first reading, read a first address conversion table corresponding to the first logical address from the non-volatile memory, and store, in the non-volatile memory, a second address conversion table of a first state stored in the first memory in a case where the first logical address corresponds to a second logical address stored in the second memory.

Hereinafter, embodiments will be described with reference to the drawings. In the drawings, the same components will be assigned with the same symbol.

First Embodiment

In the following, a memory system according to a first embodiment will be described using FIGS. 1 to 15.

Further, in the following description, "to couple" includes "to directly couple" and as well "to couple through any element" unless otherwise specified. In addition, a first terminal of a transistor indicates one of a source and a drain, and a second terminal of the transistor indicates the other one of the source and the drain. In addition, a control terminal of the transistor indicates a gate.

Configuration Example of First Embodiment

FIG. 1 is a block diagram illustrating a memory system 300 according to a first embodiment.

As illustrated in FIG. 1, the memory system 300 includes a plurality of, for example four, NAND flash memories 100 (100_1 to 100_4), and a memory controller 200 which controls these NAND flash memories.

The NAND flash memory 100 and the memory controller 200 may be configured by one semiconductor device by combining these memories for example. Examples of the memory system 300 include a memory card such as an SD™ card or an SSD (Solid State Drive), etc.

The number of NAND flash memories 100 controlled by one memory controller 200 in the memory system 300 is not limited to four. The NAND flash memory 100 and the memory controller 200 each may be formed in different semiconductor chips. In addition, the NAND flash memories 100_1 to 100_4 may be formed in different semiconductor chips. In the following, semiconductor chips formed with the NAND flash memory 100 and the memory controller 200 may be called a memory chip and a memory controller chip, respectively.

The NAND flash memory 100 includes a plurality of memory cells, and stores data in a non-volatile manner. The memory controller 200 is coupled to the NAND flash memory 100 through a NAND bus, and coupled to a host 400 through a host bus. Then, the memory controller 200 controls the NAND flash memory 100. In addition, the memory controller 200 accesses the NAND flash memory 100 in response to a command received from the host 400.

The host 400 is, for example, a digital camera or a personal computer, etc., and the host bus may conform to an SD™ interface, for example.

The memory controller 200 includes a processor (CPU) 211, a host interface circuit 212, a built-in memory (RAM (Random Access Memory)) 213, a buffer memory 214, an ECC (Error Checking and Correcting) circuit 215, and a NAND interface circuit 216.

The host interface circuit 212 is coupled with the host 400 through the host bus. The host interface circuit 212 transmits the command and the data received from the host 400 to the processor 211 and the buffer memory 214 respectively.

The processor 211 controls the entire operations of the memory controller 200. For example, when receiving a write command from the host 400, the processor 211 issues a write command to the NAND interface circuit 216. Similarly, when receiving a read command, the processor issues a read command to the NAND interface circuit 216. In addition, the processor 211 performs various processes to manage the NAND flash memory 100 such as wear leveling, etc. Further, some or all of the functions realized by the processor 211 may be realized by dedicated hardware.

The NAND interface circuit 216 is coupled to the NAND flash memory 100 through the NAND bus, and communicates with the NAND flash memory 100. Then, the NAND interface circuit 216 transmits various types of signals to the NAND flash memory 100 on the basis of a command received from the processor 211, and receives various types of signals from the NAND flash memory 100.

The buffer memory 214 temporarily stores write data and read data.

The built-in memory 213 is a volatile semiconductor memory such as a DRAM or an SRAM, etc., and used as a work area of the processor 211. Then, the built-in memory 213 stores firmware for managing the NAND flash memory 100 or various types of management tables, etc. Details of the built-in memory 213 will be described later.

The ECC circuit 215 performs an error detection related to the data read from the NAND flash memory 100 and an error correction. In other words, the ECC circuit 215 generates an error correction code at the time of write data, and adds the code to the write data. Then, the ECC circuit 215 corrects an error in the read data using the added error correction code at the time of reading the data.

FIG. 2 is a block diagram illustrating the NAND flash memory 100 of the memory system 300 according to the first embodiment.

As illustrated in FIG. 2, the NAND flash memory 100 includes an input/output circuit 110, a logic circuit 111, an address register 112, a command register 113, a sequencer 114, a voltage generation circuit 115, a memory cell array 116, a row decoder 117, a sense amplifier 118, and a column decoder 120.

The logic circuit 111 receives a chip enable signal CEn, a command latch enable signal CLE, an address latch enable signal ALE, a write enable signal WEn, a read enable signal REn/RE, and an input/output clock DQS/DQSn from the memory controller 200 through the NAND bus. Then, the logic circuit 111 transmits these signals to the input/output circuit 110 and the sequencer 114 as needed.

The input/output circuit 110 transmits the signal DQS/DQSn, and receives/transmits a signal DQ<0:7>. The notation of the signal DQ<0:7> shows a signal DQ in which 8-bit signals DQ0-DQ7 are collectively combined, and will be simply denoted as the signal DQ if there is no need to distinct bits. The input/output circuit 110 transmits the signal DQ to the address register 112 if the signal DQ is an address, to the command register 113 if the signal DQ is a command, and to the sense amplifier 118 if the signal DQ is write data at the time of writing the data. On the other hand, the read data transmitted from the sense amplifier 118 is transmitted to the memory controller 200 along with the signal DQS/DQSn at the time of reading the data.

The signal CEn is provided for every chip, and the other signals ALE, CLE, WEn, REn/RE, DQS/DQSn, and DQ are commonly used in the plurality of memory chips.

The address register 112 stores an address assigned from the memory controller 200. The command register 113 stores a command provided from the memory controller 200.

The sequencer 114 controls the entire operation of the NAND flash memory 100. More specifically, the sequencer 114 instructs a necessary operation to a necessary circuit block at timing when the logic circuit 111 receives various types of signals according to a command stored in the command register 113.

The voltage generation circuit 115 supplies a necessary voltage to the memory cell array 116, the row decoder 117, and the sense amplifier 118 according to the control of the sequencer 114.

The memory cell array 116 stores data sent from the memory controller 200 for example.

Figure 3:
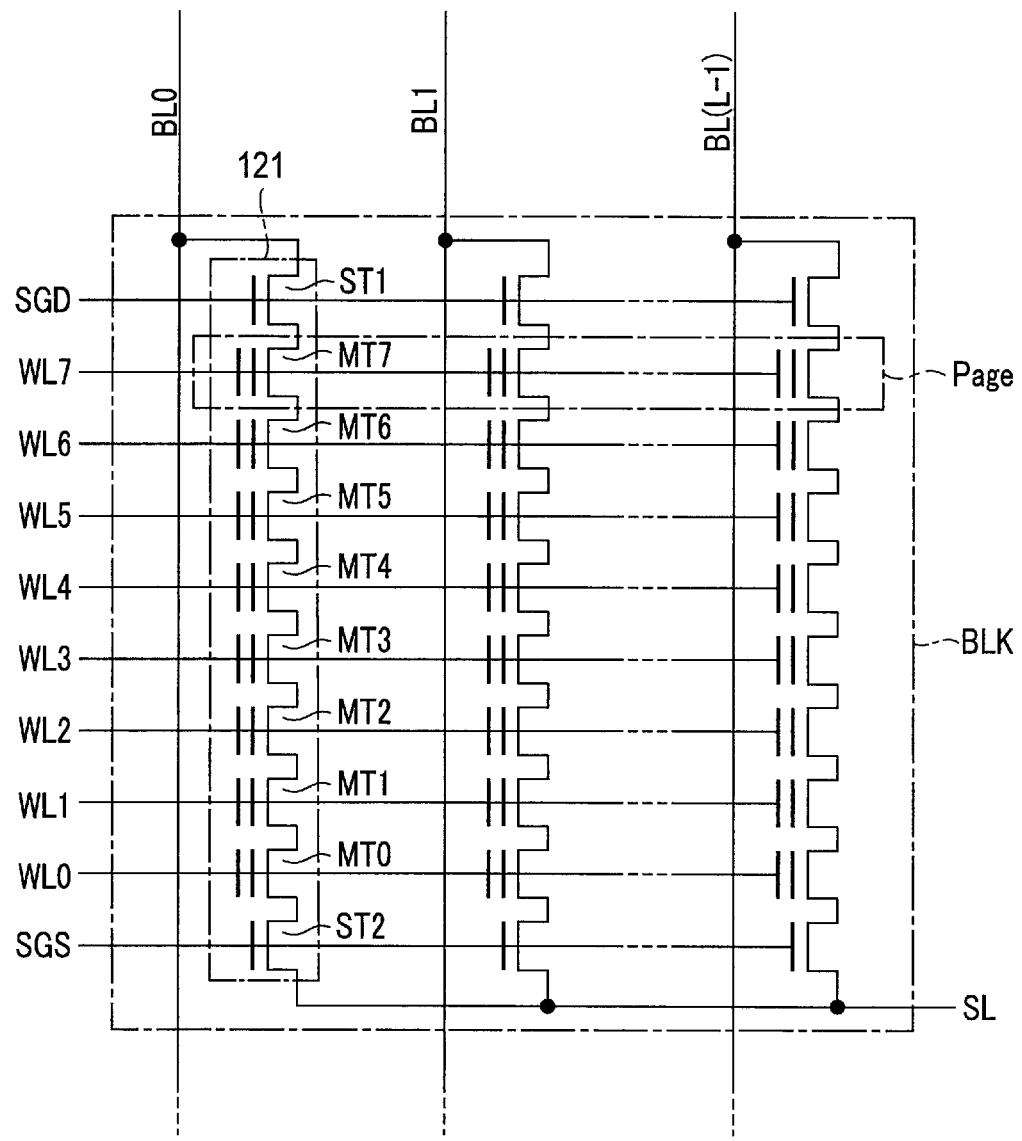
FIG. 3 is a circuit diagram illustrating a memory cell array of the memory system according to the first embodiment.

FIG. 3 is a circuit diagram illustrating the memory cell array 116 of the memory system 300 according to the first embodiment.

As illustrated in FIG. 3, the memory cell array 116 includes a block BLK. The block BLK includes a plurality of NAND strings 121. Each of the NAND strings 121 includes, for example, eight memory cell transistors MT (MT0 to MT7) and select transistors ST1 and ST2. The memory cell transistor MT includes a control gate and a charge accumulation layer, and stores data in a non-volatile manner. Then, the memory cell transistor MT is electrically coupled between the first terminal of the select transistor ST1 and the first terminal of the select transistor ST2 in series.

The control terminal of the select transistor ST1 in the same block is commonly coupled to a select gate line SGS. In addition, the control terminal of the select transistor ST2 in the same block is commonly coupled to the select gate line SGS. Similarly, the control terminals of the memory cell transistors MT0 to MT7 in the same block are commonly coupled to word lines WL0 to WL7 respectively.

In addition, the second terminal of the select transistor ST1 of the NAND string 121 (the same column) is commonly coupled to a bit line BL (BL0 to BL(L−1); herein, L is a natural number of 2 or more). In other words, the bit line BL commonly couples the NAND string 121 among the plurality of blocks BLK. Further, the second terminals of the plurality of select transistors ST2 are commonly coupled to a source line SL.

Each memory cell transistor MT can store one-bit data or a plurality of bits of data. Then, the memory cell transistors MT coupled to the same word line WL are collectively written with data. The collectively written data may be called "page".

In a case where the memory cell transistor MT stores one bit, a set of the memory cell transistors MT coupled to each word line WL corresponds to a page. In other words, one page is assigned to one word line WL, and the block BLK containing eight word lines WL includes a capacity of eight pages.

In addition, in a case where the memory cell transistor MT stores, for example, two bits (these two bits each are called a lower bit and an upper bit), a set of lower bits stored in the memory cells coupled to the same word line is one page (lower page), and a set of upper bits is another one page (upper page). In other words, two pages are assigned to one word line WL, and the block BLK has a capacity of sixteen pages. Therefore, "page" may be defined as at least a part of memory space which is formed by the memory cells coupled to the same word line. The writing and the reading of data may be performed on every page. On the other hand, data erasing is performed by units of blocks BLK.

Further, the memory cell array 116 may be configured such that the memory cell transistors are three-dimensionally stacked on a semiconductor substrate. As an example of this configuration, metal wiring layers each serving as the select gate line SGS, the word lines WL0 to WL7, and the select gate line SGD are sequentially formed, and a semiconductor pillar serving as a current path of the NAND string 121 is provided to pass through these layers. Then, a metal wiring layer serving as the bit line BL is formed to be connected to one end of the semiconductor pillar. The configuration of the three-dimensional NAND flash memory is disclosed in U.S. Ser. No. 12/407,403 "THREE DIMENSIONAL STACKED NONVOLATILE SEMICONDUCTOR MEMORY" filed on Mar. 19, 2009 for example. In addition, U.S. Ser. No. 12/406,524 "THREE DIMENSIONAL STACKED NONVOLATILE SEMICONDUCTOR MEMORY" filed on Mar. 18, 2009, U.S. Ser. No. 12/679,991 "NON-VOLATILE SEMICONDUCTOR STORAGE DEVICE AND METHOD OF MANUFACTURING THE SAME" filed on Mar. 25, 2010, and U.S. Ser. No. 12/532,030 "SEMICONDUCTOR MEMORY AND METHOD FOR MANUFACTURING SAME" filed on Mar. 23, 2009 disclose the configuration of the three-dimensional NAND flash memory. The entire contents of these Patent Applications are incorporated in the specification by reference.

In addition, the data erasing can be performed in units of blocks BLK or in units smaller than the block BLK. An example of an erasing method is disclosed in U.S. Ser. No. 13/235,389 "NONVOLATILE SEMICONDUCTOR MEMORY DEVICE" filed on Sep. 18, 2011. In addition, U.S. Ser. No. 12/694,690 "NON-VOLATILE SEMICONDUCTOR STORAGE DEVICE" filed on Jan. 27, 2010 is disclosed. Further, U.S. Ser. No. 13/483,610 "NONVOLATILE SEMICONDUCTOR MEMORY DEVICE AND DATA ERASE METHOD THEREOF" filed on May 30, 2012 is disclosed. The entire contents of these Patent Applications are incorporated in the specification by reference.

Further, as illustrated in FIG. 2, the memory cell array 116 includes a user data storage area 123 and a logical-physical conversion table storage area 124. The user data storage area 123 stores user data received from the host 400. The logical-physical conversion table storage area 124 stores a logical-physical conversion table (hereinafter, also simply referred to as an address conversion table). The logical-physical conversion table is a table in which a logical address designated by the host 400 and a physical address of the NAND flash memory 100 are associated. The details of the logical-physical conversion table will be described later.

The row decoder 117 decodes a row address stored in the address register 112. Then, the row decoder 117 selects any one of blocks in the memory cell array 116 on the basis of the decoding result, and further selects a row direction in the selected block.

The sense amplifier 118 senses data read from the memory cell array 116 at the time of reading the data, and performs a necessary calculation. Then, the sense amplifier 118 transmits the read data to the input/output circuit 110. On the other hand, the sense amplifier 118 writes the data received from the input/output circuit 110 to the memory cell array 116 at the time of writing the data.

The column decoder 120 decodes a column address stored in the address register 112. Then, the column decoder 120 selects a column position of the sense amplifier 118 on the basis of the decoding result. For example, at the time of reading the data, the read data is sequentially transmitted, in units of columns, to the memory controller 200 from the column position selected by the column decoder 120.

FIG. 4 is a diagram illustrating the logical-physical conversion table in the NAND flash memory 100 of the memory system 300 according to the first embodiment.

As illustrated in FIG. 4, the logical-physical conversion table indicates a physical addresses corresponding to a logical addresses.

The logical address is an address designated by the host 400. In FIG. 4, 0x00000000-0x00000003, . . . , 0x00010000-0x00010003, and so on are listed as the logical addresses. On the other hand, the physical address indicates a location in the NAND flash memory 100 and, for example, a chip address, a block address, a page address (the word line WL), and an intra-page address (offset) are assigned. One logical address corresponds to one physical address. For example, in FIG. 4, the logical address 0x00000000 corresponds to the physical address CHIP=1, BLOCK=0, WL=1, and OFFSET=3. Further, in the following description, the logical-physical conversion table means a set of a logical address and a physical address, or a plurality of sets. The logical-physical conversion table indicates a correspondence between the logical addresses and the physical addresses in the memory system 300, and thus is necessarily stored in the NAND flash memory 100 in a non-volatile manner similarly to the data written from the host 400.

The host 400 does not recognize the physical address of the NAND flash memory 100. The host 400 recognizes the logical address on the basis of the memory capacity of the NAND flash memory 100, and accesses the memory controller 200 using the logical address.

The memory controller 200 manages a relation between the logical address designated by the host 400 and the physical address in the NAND flash memory 100. Then, the memory controller 200 searches for the logical-physical conversion table using the logical address designated by the host 400, and accesses the physical address of the corresponding NAND flash memory 100.

FIG. 5 is a block diagram illustrating contents stored in the built-in memory 213 of the memory system 300 according to the first embodiment.

As illustrated in FIG. 5, the built-in memory 213 stores a table cache 221, a difference table 222, and an access information 223.

The table cache 221 caches (stores) the corresponding logical-physical conversion table from the NAND flash memory 100 on the basis of the logical address received from the host 400 at the time of reading. The difference table 222 stores a set of the logical address and the physical address (i.e., logical-physical conversion table) which are updated at the time of writing. The access information 223 stores past access information. More specifically, the access information 223 stores information related to the logical-physical conversion table which is ejected (in other words, erased) from the table cache 221 at the time of reading. In the following, the table cache 221, the difference table 222, and the access information 223 will be described in detail.

FIG. 6 is a diagram illustrating an example of the logical-physical conversion table in the table cache 221 of the memory system 300 according to the first embodiment. FIG. 7 is a diagram illustrating an example of information of each line in the table cache 221 of the memory system 300 according to the first embodiment.

As illustrated in FIG. 6, the table cache 221 caches the logical-physical conversion table which is stored in the NAND flash memory 100. For example, in FIG. 6, among the logical-physical conversion tables store in the NAND flash memory 100 as illustrated in FIG. 4, the logical-physical conversion table corresponding to the logical addresses 0x00000000 to 0x00000003 is cached. The logical-physical conversion table cached in the table cache 221 is used in reading, and thus a physical address for read access is acquired. The capacity of the table cache 221 is smaller than that of the logical-physical conversion table in the NAND flash memory 100. In other words, only a part of the logical-physical conversion table in the NAND flash memory 100 can be cached in the table cache 221. Therefore, in a case where the capacity of the table cache 221 is not sufficient when a new logical-physical conversion table is cached from the NAND flash memory 100, the logical-physical conversion table stored previously in the table cache 221 should be ejected, and the new logical-physical conversion table (the logical-physical conversion table corresponding to another logical address) is cached.

In addition, as illustrated in FIG. 7, the table cache 221 manages the logical-physical conversion table in a predetermined unit (for example, 512 B), and each line is configured in the predetermined unit. The line includes a line number, a line head logical address, CLEAN/DIRTY information, and an ejection priority.

The line number is a number to manage the line. The line head logical address is a head logical address among the plurality of logical addresses in the logical-physical conversion table which is managed by the line. The CLEAN/DIRTY information indicates whether the logical-physical conversion table of the line is a CLEAN state or a DIRTY state. The CLEAN state is a state where the logical-physical conversion table of the line is stored (non-volatilized) in the NAND flash memory 100, and indicates a state where both of the table cache 221 and the NAND flash memory 100 are updated. In other words, information of the corresponding logical-physical conversion table stored in the NAND flash memory 100 and information of the corresponding logical-physical conversion table stored in the table cache 221 are same. On the other hand, the DIRTY state is a state where the logical-physical conversion table of the line is not non-volatilized in the NAND flash memory 100, and indicates a state where only the table cache 221 is updated. In other words, information of the corresponding logical-physical conversion table stored in the NAND flash memory 100 and information of the corresponding logical-physical conversion table stored in the table cache 221 are different. Therefore, the logical-physical conversion table of the DIRTY state cannot be erased. The ejection priority is an ejection order (priority) in a case where the capacity of the table cache 221 is insufficient when a new logical-physical conversion table is cached, and a line having a smallest number of the ejection priority (for example, the line of "0" ejection priority) will be ejected first. The ejection priority is an order to have been cached in the table cache 221, for example. The ejection priority may be substituted with a time stamp, for example, according to an ejection algorithm in the table cache 221.

For example, in FIG. 7, a logical-physical conversion table of the line number 0x0000 has a head logical address of 0x00000000, and corresponds to consecutive logical addresses (for example, 0x00000000 to 0x0000007f). The logical-physical conversion table of the line number 0x0000 is in the CLEAN state. In addition, the ejection priority of the line number 0x0000 is "2".

FIG. 8 is a diagram illustrating an example of the difference table 222 of the memory system 300 according to the first embodiment.

As illustrated in FIG. 8, the difference table 222 stores a set of the logical address and the physical address (the logical-physical conversion table) which are updated at the time of writing (e.g., when the memory controller 200 writes data received from the host 400). For example, FIG. 8 illustrates an example of updating the physical addresses corresponding to the logical addresses 0x00000000 to 0x00000003. The updated logical-physical conversion table is added to the difference table 222 at the time of writing. Then, in a case where an amount of updated information of the difference table 222 is equal to or more than a threshold, the logical-physical conversion table stored in the difference table 222 is stored in the table cache 221, and the logical-physical conversion table in the table cache 221 is updated to reflect the updated information of the difference table 222.

FIG. 9 is a diagram illustrating an example of the access information 223 of the memory system 300 according to the first embodiment.

As illustrated in FIG. 9, the access information 223 includes information related to the logical-physical conversion table which is ejected from the table cache 221. More specifically, the access information 223 includes the line head logical address in the line of the logical-physical conversion table which is ejected from the table cache 221. For example, in FIG. 9, the logical-physical conversion tables of the lines having the line head logical addresses of 0x00002000 and 0x00003000 are ejected from the table cache 221. The information in the access information 223 is used at the time of reading to determine whether the reading is a local access to the logical address (i.e., an access to a narrow logical address space, hereinafter, referred to as local access). In other words, it is determined whether an access frequency to a target logical address is high. High access frequency may indicate that the number of accesses is equal to or more than the predetermined number.

Operation Example of First Embodiment (Update Operation of Updated Information of Difference Table in First Embodiment)

Figure 10:
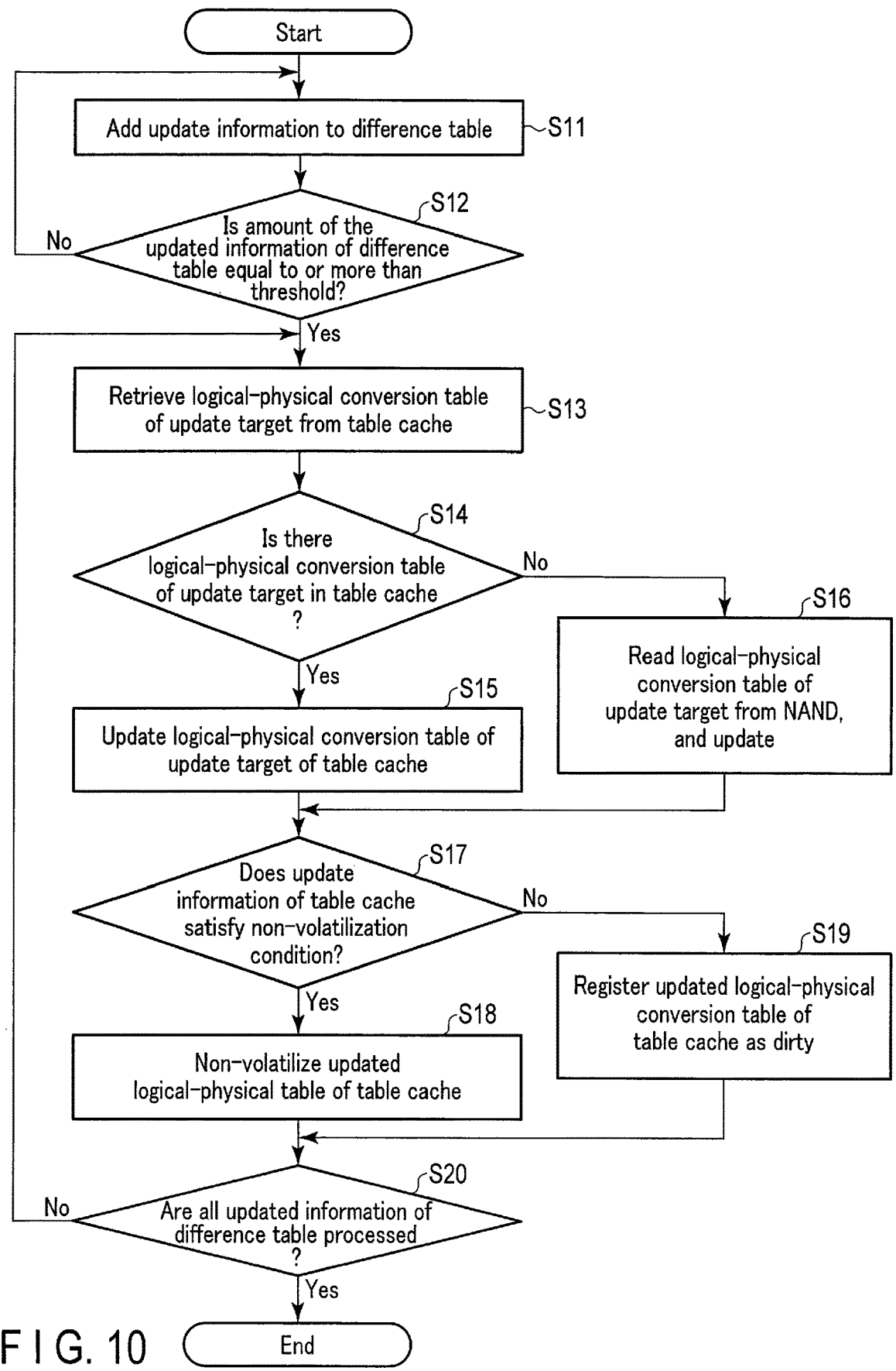
FIG. 10 is a flowchart illustrating an update operation of updated information of the difference table in the memory system according to the first embodiment.

FIG. 10 is a flowchart illustrating an update operation of the updated information of the difference table 222 in the memory system 300 according to the first embodiment.

In this example, the updated information (that is, the updated logical-physical conversion table which is not cached in the table cache 221) is added to the difference table 222 at each time of writing. Then, in a case where the updated information amount of the difference table 222 is equal to or more than the threshold, the logical-physical conversion table stored in the difference table 222 is stored in the table cache 221, and the logical-physical conversion table of the table cache 221 is updated. Further, in a case where the updated logical-physical conversion table of the table cache 221 satisfies a non-volatilization condition, the updated information is non-volatilized and, if not, the updated information is registered as the DIRTY state without non-volatilizing. The details are as follows.

As illustrated in FIG. 10, first, in Step S11, the processor 211 adds the updated information to the difference table 222. More specifically, the processor 211 stores, in the difference table 222, the logical-physical conversion table updated at the time of writing for example.

Next, in Step S12, it is determined whether the amount of the updated information of the difference table 222 is equal to or more than the threshold. For example, a four-entry threshold can be used, but the threshold is not limited thereto.

In a case where it is determined in Step S12 that the amount of the updated information is smaller than the threshold, the writing is performed again and the logical-physical conversion table is updated, and then in Step S11 the processor 211 adds the updated information to the difference table 222. On the other hand, in a case where it is determined in Step S12 that the amount of the updated information is equal to or more than the threshold, the processor 211 retrieves a logical-physical conversion table to be updated from the table cache 221 in Step S13.

Next, in Step S14, it is determined whether the logical-physical conversion table to be updated is in the table cache 221.

In a case where it is determined in Step S14 that the logical-physical conversion table to be updated is in the table cache 221, the processor 211 updates the logical-physical conversion table in the table cache 221 on the basis of the logical-physical conversion table of the difference table 222 in Step S15.

On the other hand, in a case where it is determined in Step S14 that the logical-physical conversion table to be updated is not in the table cache 221, the processor 211 reads the logical-physical conversion table to be updated from the NAND flash memory 100 and caches the update target in the table cache 221 in Step S16. Then, the processor 211 updates the logical-physical conversion table cached in the table cache 221 on the basis of the logical-physical conversion table of the difference table 222.

Next, in Step S17, it is determined whether the updated information of the table cache 221 satisfies the non-volatilization condition. The non-volatilization condition indicates, for example, that the amount of the updated information of the table cache 221 reaches a unit, that is, a page unit (for example, 16 KiB) by which the updated information is non-volatilized (written) into the NAND flash memory 100. In another example, the non-volatilization condition may indicate, for example, that the table cache 221 is not updated over a predetermined time.

In a case where it is determined in Step S17 that the updated information satisfies the non-volatilization condition, the processor 211 non-volatilizes the updated logical-physical conversion table of the table cache 221 in Step S18. In other words, the processor 211 stores the updated logical-physical conversion table of the table cache 221 into the NAND flash memory 100.

On the other hand, in a case where it is determined in Step S17 that the updated information does not satisfy the non-volatilization condition, the processor 211 registers the updated logical-physical conversion table of the table cache 221 in the table cache 221 as the DIRTY state in Step S19. At this time, the processor 211 does not perform the non-volatilization on the NAND flash memory 100.

For example, if the non-volatilization is performed when the amount of the updated information of the table cache 221 does not reach the page unit, not only the actually updated logical-physical conversion table but also the logical-physical conversion table which is not updated should also be non-volatilized to conform to the page unit. In other words, the NAND flash memory 100 is written with unnecessary data, which is burdened on the NAND flash memory 100 and takes a long time. Therefore, in this example, the non-volatilization is performed only when the updated information of the table cache 221 reaches the page unit.

Thereafter, in Step S20, it is determined whether all the updated information of the difference table 222 is processed. In a case where it is determined in Step S20 that all the updated information is not processed, the processor 211 retrieves the logical-physical conversion table to be updated from the table cache 221 again in Step S13. On the other hand, in a case where it is determined in Step S20 that all the updated information is processed, the operation is ended.

Reading in First Embodiment

Figure 11:
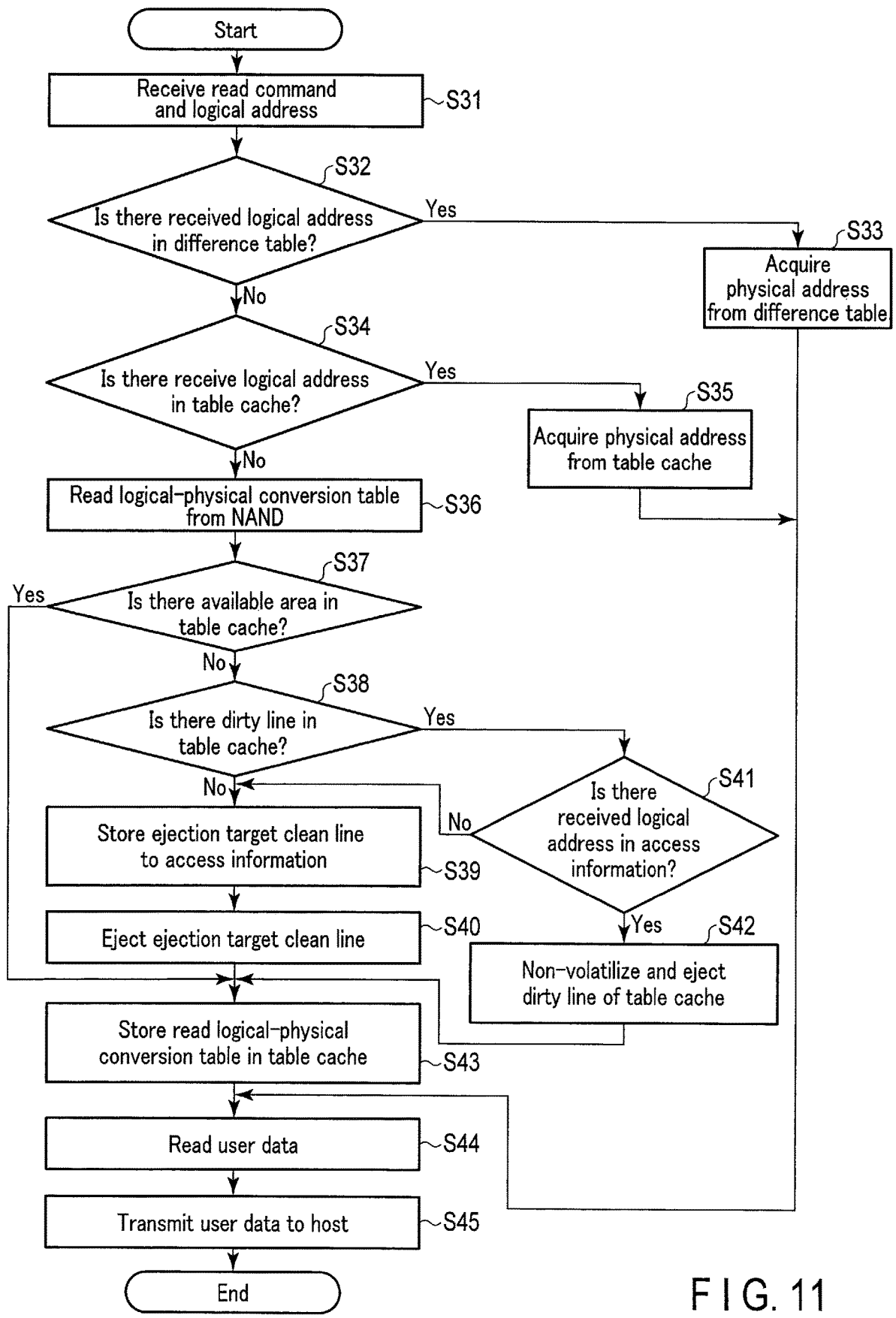
FIG. 11 is a flowchart illustrating a reading of the memory system according to the first embodiment.

FIG. 11 is a flowchart illustrating a reading of the memory system 300 according to the first embodiment.

In this example, the logical-physical conversion table is cached from the NAND flash memory 100 to the table cache 221 at the time of reading, and the logical-physical conversion table in the table cache 221 is replaced. At this time, in a case where it is determined that the reading is a local access, the logical-physical conversion table of the DIRTY state in the table cache 221 is non-volatilized and ejected. The details are as follows.

As illustrated in FIG. 11, first, in Step S31, the processor 211 receives a read command and a logical address from the host 400.

Next, in Step S32, it is determined whether the received logical address is in the difference table 222.

In a case where it is determined in Step S32 that the received logical address is in the difference table 222, the processor 211 refers to the logical-physical conversion table corresponding to the received logical address using the difference table 222 in Step S33. Thus, the processor 211 acquires the physical address corresponding to the received logical address.

When the physical address is acquired in Step S33, the processor 211 reads user data from the acquired physical address of the NAND flash memory 100 in Step S44. Then, in Step S45, the processor 211 transmits the read user data to the host 400.

In a case where it is determined in Step S32 that the received logical address is not in the difference table 222, it is determined in Step S34 whether the received logical address is in the table cache 221.

In a case where it is determined in Step S34 that the received logical address is in the table cache 221, the processor 211 refers to the logical-physical conversion table corresponding to the received logical address using the table cache 221 in Step S35. Thus, the processor 211 acquires the physical address corresponding to the received logical address.

When the physical address is acquired in Step S35, the user data is read from the NAND flash memory 100 in Step S44, and the read user data is transmitted to the host 400 in Step S45 similarly to the procedures after Step S33.

In a case where it is determined in Step S34 that the received logical address is not in the table cache 221, the processor 211 reads the logical-physical conversion table corresponding to the received logical address from the NAND flash memory 100 in Step S36.

Next, in Step S37, it is determined whether there is an available area in the table cache 221. In other words, it is determined whether the table cache 221 has an available area sufficient to store the read logical-physical conversion table.

In a case where it is determined in Step S37 that there is an available area in the table cache 221, the processor 211 caches the read logical-physical conversion table in the table cache 221 in Step S43. Thus, the processor 211 acquires the physical address corresponding to the received logical address.

In a case where it is determined in Step S37 that there is no available area in the table cache 221, it is determined in Step S38 whether there is a DIRTY line (i.e., a line of the DIRTY state) in the table cache 221.

In a case where it is determined in Step S38 that there is no DIRTY line in the table cache 221, the processor 211 stores an ejection target CLEAN line (i.e., a line of the CLEAN state) in the access information 223 in Step S39. The ejection target CLEAN line indicates a CLEAN line of which the ejection priority is highest (i.e., number of the ejection priority is smallest). At this time, the line head logical address of the ejection target CLEAN line is registered in the access information 223.

Next, in Step S40, the processor 211 ejects the ejection target CLEAN line. In other words, the logical-physical conversion table of the ejection target line is erased from the table cache 221, and an available area is provided in the table cache 221.

When the available area is provided in the table cache 221 in Step S40, the processor 211 caches the read logical-physical conversion table in the table cache 221 in Step S43. Thus, the processor 211 acquires the physical address corresponding to the received logical address.

In a case where it is determined in Step S38 that there is a DIRTY line in the table cache 221, it is determined in Step S41 whether the received logical address is in the access information 223. More specifically, the processor 211 compares the received logical address with the line head logical address registered in the access information 223. Then, the processor 211 determines whether the received logical address is included within a range indicated by the line head logical address of the access information 223. Thus, it is determined whether the received logical address is related to a local access.

In a case where it is determined in Step S41 that the received logical address is not in the access information 223, the ejection target CLEAN line is registered in the access information 223 in Step S39.

In a case where it is determined in Step S41 that the received logical address is registered in the access information 223, the processor 211 non-volatilizes all the DIRTY lines in the table cache 221 to eject the lines in Step S42. In other words, the processor 211 stores the logical-physical conversion tables corresponding to all the DIRTY lines in the table cache 221 into the NAND flash memory 100. Then, the logical-physical conversion tables corresponding to all the DIRTY lines in the table cache 221 are erased from the table cache 221, and an available area is provided in the table cache 221.

When the available area is provided in the table cache 221 in Step S42, the read logical-physical conversion table is cached in the table cache 221 in Step S43, and the physical address corresponding to the received logical address is acquired similarly to the procedures after Step S40.

Thereafter, similarly to Step S33 and the procedures after Step S35, the user data is read from the NAND flash memory 100 in Step S44, and the read user data is transmitted to the host 400 in Step S45.

The above reading operation will be described in more detail.

Figure 12:
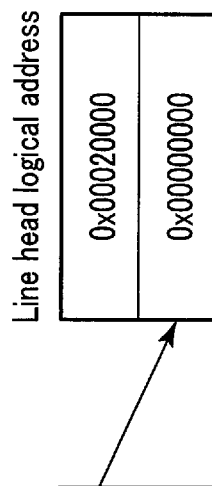

FIGS. 12 and 13 are diagrams illustrating a first example of the reading in the memory system 300 according to the first embodiment. FIGS. 14 and 15 are diagrams illustrating a second example of the reading in the memory system 300 according to the first embodiment. Herein, the first example shows a case where the received logical address is registered in the access information 223, and the second example shows a case where the received logical address is not registered in the access information 223.

As illustrated in FIG. 12, in the first example, first, the logical address 0x00003200 (the head logical address) is received from the host 400. Then, a line corresponding to the logical address 0x00003200 is read from the logical-physical conversion table which is stored in the NAND flash memory 100.

At this time, there is no available area in the table cache 221, and there is a DIRTY line in the table cache 221. Therefore, it is determined whether the received logical address 0x00003200 is included within a range indicated by the line head logical address of the access information 223. In the access information 223, 0x00020000 is stored as the line head logical address and, for example, the logical addresses 0x00020000 to 0x0002007f are included. Therefore, the received logical address 0x00003200 is not included within a range indicated by the line head logical address of the access information 223. For this reason, the DIRTY line in the table cache 221 is not ejected, but the CLEAN line of the highest ejection priority becomes an ejection target. Herein, the CLEAN line (the line head logical address 0x00000000) of the ejection priority of "1" becomes an ejection target. Then, the line head logical address 0x00000000 of the ejection target CLEAN line is registered in the access information 223.

Thereafter, as illustrated in FIG. 13, the ejection target CLEAN line is ejected, and an available area is provided in the table cache 221. Then, the line of the logical address 0x00003200 read from the NAND flash memory 100 is stored in the table cache 221. In addition, the ejection priorities of the respective lines other than the DIRTY line of the ejection priority of "0" move up.

As illustrated in FIG. 14, in the second example, first, the logical address 0x00020000 (the head logical address) is received from the host 400. Then, a line corresponding to the logical address 0x00020000 is read from the logical-physical conversion table stored in the NAND flash memory 100.

At this time, there is no available area in the table cache 221, and there is a DIRTY line in the table cache 221. Therefore, it is determined whether the received logical address 0x00020000 is included within a range indicated by the line head logical address of the access information 223. The line head logical address 0x00020000 (corresponding to the logical addresses 0x00020000 to 0x0002007f) is stored in the access information 223. Therefore, the received logical address 0x00020000 is included within a range indicated by the line head logical address of the access information 223. For this reason, all the DIRTY lines in the table cache 221 are non-volatilized into the NAND flash memory 100.

Thereafter, as illustrated in FIG. 15, the non-volatilized DIRTY line is ejected, and an available area is provided in the table cache 221. Then, a line corresponding to the logical address 0x00020000 is stored in the table cache 221 from the logical-physical conversion table stored in the NAND flash memory 100. In addition, the ejection priorities of the respective lines move up.

Effects of First Embodiment

In the following, problems of the memory system 300 in a first comparative example and a second comparative example and effects of the first embodiment will be described.

In the memory system 300 in the first comparative example, the logical-physical conversion table is stored in the NAND flash memory 100. At the time of reading, first, the logical-physical conversion table is read from the NAND flash memory 100 according to the logical address designated by the host 400. Then, a physical address corresponding to the designated logical address is acquired from the logical-physical conversion table, and the user data is read from the NAND flash memory 100 on the basis of the acquired physical address. In other words, at the time of reading in the first comparative example, two times of reading from the NAND flash memory 100, that is, the reading of the logical-physical conversion table and the reading of the user data are performed. Therefore, the reading is burdened on the NAND flash memory 100 and also the reading speed becomes slow, and thus the read performance is degraded.

In order to solve the problem, in the memory system 300 in the second comparative example, the logical-physical conversion table of the NAND flash memory 100 is cached in the table cache 221 of the memory controller 200, and the cached logical-physical conversion table in the memory controller 200 is used. Therefore, it is possible to reduce the number of the reading of the logical-physical conversion table from the NAND flash memory 100, and suppress the performance degradation in the reading. However, since the table cache 221 has a small capacity, only a part of the logical-physical conversion table stored in the NAND flash memory 100 can be cached. Therefore, there is a need to replace properly the logical-physical conversion table in the table cache 221.

On the other hand, when new data is written in the writing of the second comparative example, the logical-physical conversion table is updated. At this time, in a case where the updating-target logical-physical conversion table is in the table cache 221, the updating process is performed on the table cache 221. In addition, in a case where the updating-target logical-physical conversion table is not in the table cache 221, the updating-target logical-physical conversion table is cached from the NAND flash memory 100 to the table cache 221 first, and the updating process is performed on the table cache 221. Thereafter, the logical-physical conversion table updated in the table cache 221 is not non-volatilized to the NAND flash memory 100 until the non-volatilization condition is satisfied (e.g., when satisfying the page unit). Therefore, there is a case where the latest (updated) logical-physical conversion table is left only in the table cache 221. In this way, the logical-physical conversion table comes to the DIRTY state, and is not ejected (i.e., not replaced) until non-volatilized in the next updating (i.e., at the next writing).

If the host 400 keeps requesting for the reading, the table cache 221 is not updated since the writing is not performed. With this configuration, the non-volatilization condition is not satisfied, a part of the table cache 221 is occupied by the logical-physical conversion table of the DIRTY state. For this reason, the available size of the table cache 221 at the time of reading is reduced. Thus, the logical-physical conversion table is not able to be cached in the table cache 221 at the time of reading for which, without such a series of reading, the logical-physical conversion table can be cached in the table cache 221. As a result, there is a need to read the logical-physical conversion table from the NAND flash memory 100, and the read performance is lowered.

On the contrary to the second comparative example, according to the first embodiment, if the logical-physical conversion table in the table cache 221 is replaced at the time of reading, the information of the ejected logical-physical conversion table (i.e., the head logical address) is registered in the access information 223. Then, if the reading-target logical address is registered in the access information 223 at the time of next reading, it is determined that the reading is a local access. In this case, it is determined that the logical-physical conversion table of the DIRTY state in the table cache 221 is not necessary for the local access. Thus, the logical-physical conversion table of the DIRTY state is non-volatilized and ejected, and an available area is provided in the table cache 221. The logical-physical conversion table corresponding to the reading-target logical address which is determined as the local access is cached in the available area. Therefore, a small capacity of the table cache 221 can be effectively utilized, and the read performance can be improved.

Second Embodiment

In the following, a memory system according to a second embodiment will be described using FIGS. 16 and 20.

Further, the second embodiment will be described about differences from the first embodiment, and the similar description will be omitted.

Configuration Example of Second Embodiment

Figure 16:
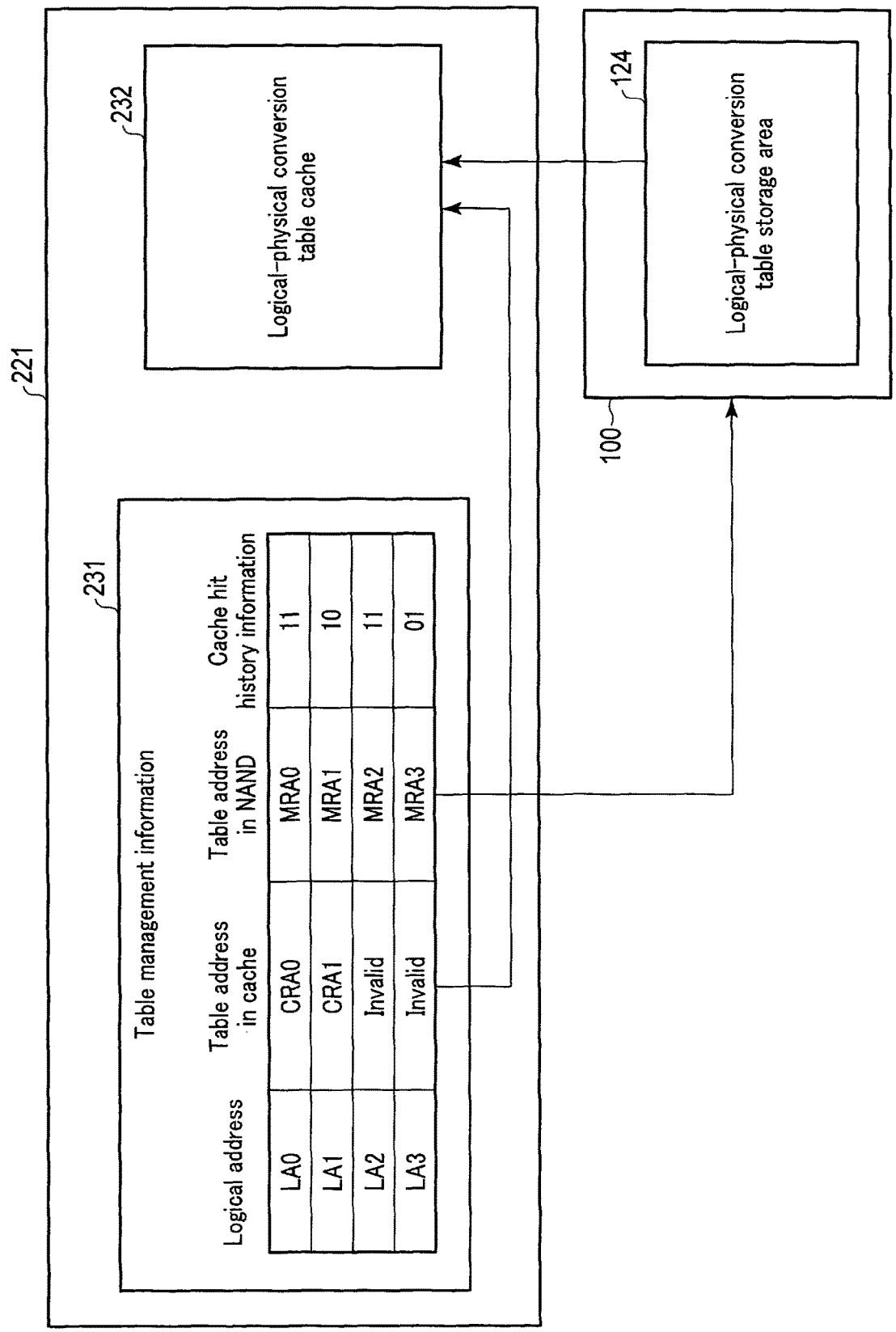
FIG. 16 is a diagram illustrating a table cache of a memory system according to a second embodiment.

FIG. 16 is a diagram illustrating a table cache 221 of a memory system 300 according to the second embodiment.

As illustrated in FIG. 16, the table cache 221 stores a table management information 231 and a logical-physical conversion table cache 232.

The logical-physical conversion table cache 232 caches a logical-physical conversion table stored in a NAND flash memory 100.

The table management information 231 includes information such as a "logical address," a "table address in the cache," a "table address in the NAND," and "cache hit history information."

The "table address in the cache" indicates an address (hereinafter, also referred to as Cache Region Address (CRA)) of the logical-physical conversion table cache 232 in the table cache 221. The logical-physical conversion table corresponding to a target logical address is stored in the address of the logical-physical conversion table cache 232. Further, "Invalid" in the "table address in the cache" indicates that the corresponding logical-physical conversion table is not in the table cache 221.

The "table address in the NAND" indicates an address (hereinafter, also referred to as Media Region Address (MRA)) of the logical-physical conversion table storage area 124 in the NAND flash memory 100. At the address of the logical-physical conversion table storage area 124, the logical-physical conversion table corresponding to the target logical address is stored.

The cache hit history information is information indicating a history of whether the logical-physical conversion table corresponding to the reading-target logical address at the time of previous reading was in the table cache 221.

Figure 17:
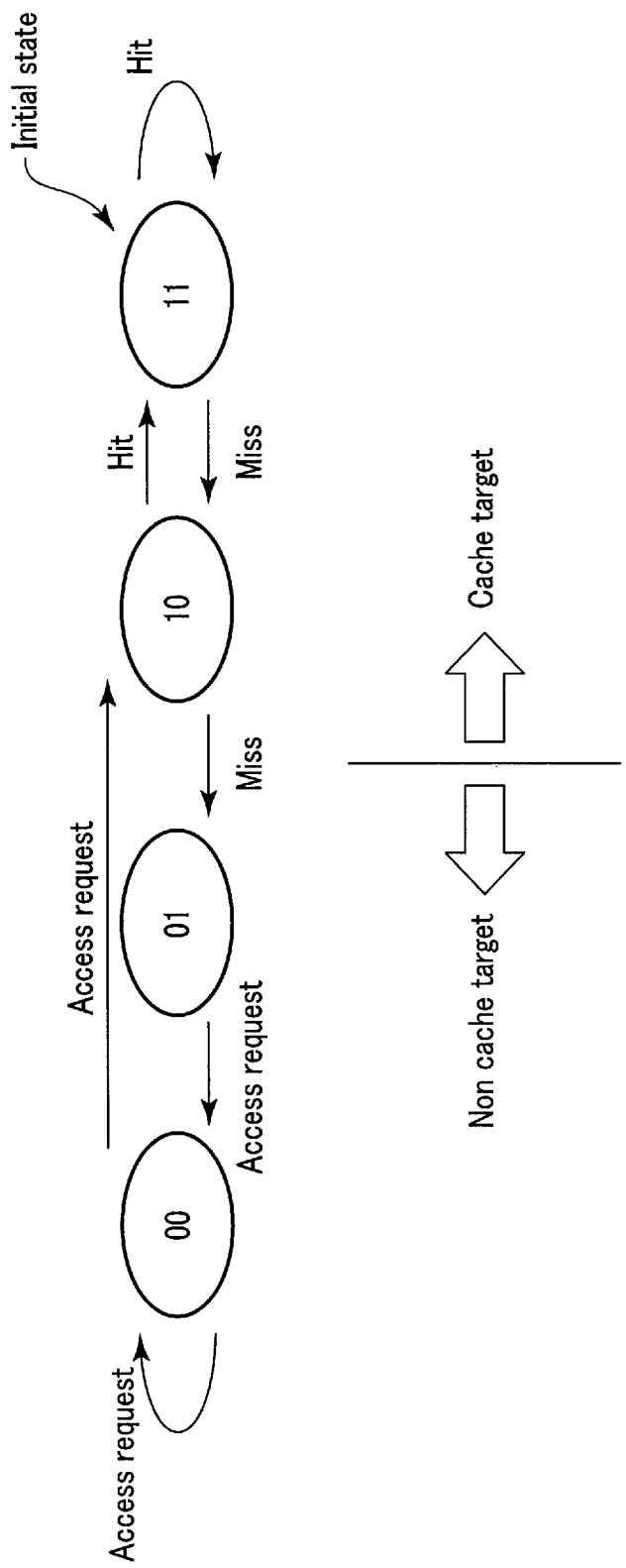
FIG. 17 is a diagram illustrating cache hit history information of the memory system according to the second embodiment.

FIG. 17 is a diagram illustrating the cache hit history information of the memory system according to the second embodiment 300.

As illustrated in FIG. 17, the cache hit history information is information indicated by two bits (i.e., "00", "01", "10", and "11"). In a case where the cache hit history information is a first value (here, "10" or "11"), it is determined that the logical address is related to a local access (i.e., a high access frequency), and the corresponding logical-physical conversion table is cached in the table cache 221 at the time of reading. Thus, the logical-physical conversion table having the cache hit history information of "10" or "11" becomes a cache target. On the other hand, in a case where the cache hit history information is a second value (here, "00" or "01"), it is determined that the logical address is not related to a local access (i.e., a low access frequency), and the corresponding logical-physical conversion table is not cached in the table cache 221 at the time of reading. In other words, the logical-physical conversion table having the cache hit history information of "00" or "01" becomes a non-cache target.

Further, the cache hit history information is not limited to the two-bit information, and may be information having one or three bits or more.

The cache hit history information is set as follows.

As illustrated in the drawing, the cache hit history information is "11" in an initial state. In a case where the logical-physical conversion table corresponding to the target logical address is in the table cache 221 at the time of reading at this state (i.e., in the case of hitting), a processor 211 keeps the cache hit history information to "11". On the other hand, in a case where the logical-physical conversion table corresponding to the target logical address is not in the table cache 221 (i.e., in the case of missing), that is, in a case where the "table address in the cache" is "Invalid," the processor 211 sets the cache hit history information to "10".

In a case where the logical-physical conversion table corresponding to the target logical address is in the table cache 221 at the time of reading at the state of "10" (i.e., in the case of hitting), the processor 211 sets the cache hit history information to "11". On the other hand, in a case where the logical-physical conversion table corresponding to the target logical address is not in the table cache 221 (i.e., in the case of missing), that is, in a case where "the table address in the cache" is "Invalid," the processor 211 sets the cache hit history information to "01".

The logical-physical conversion table corresponding to the target logical address is not cached in the table cache 221 at the time of reading at the state where the cache hit history information is "01". That is, the "table address in the cache" is "Invalid." In this case, the processor 211 sets the cache hit history information to "00" based on an access request of the reading (e.g., when receiving a read command).

The logical-physical conversion table corresponding to the target logical address is not cached in the table cache 221 at the time of reading at the state where the cache hit history information is "00". That is, the "table address in the cache" is "Invalid." In this case, the processor 211 keeps the cache hit history information to "00" or sets the cache hit history information to "10" based on an access request of the reading.

The detailed setting method of the cache hit history information will be described below.

As in FIG. 16, for example, the "table address in the cache" at a logical address LA0 is CRA0, the "table address in the NAND" is MRA0, and the "cache hit history information" is "11". In other words, the logical-physical conversion table corresponding to the logical address LA0 is at the address CRA0 of the logical-physical conversion table cache 232 in the table cache 221. In addition, the logical-physical conversion table corresponding to the logical address LA0 is at the address MRA0 of the logical-physical conversion table storage area 124 in the NAND flash memory 100. At this time, in a case where the logical address LA0 is read, the corresponding physical address is acquired from the logical-physical conversion table of the logical-physical conversion table cache 232 in the table cache 221.

In addition, the "table address in the cache" at a logical address LA1 is CRA1, the "table address in the NAND" is MRA1, and the "cache hit history information" is "10". In other words, the logical-physical conversion table corresponding to the logical address LA1 is at the address CRA1 of the logical-physical conversion table cache 232 in the table cache 221. In addition, the logical-physical conversion table corresponding to the logical address LA1 is at the address MRA1 of the logical-physical conversion table storage area 124 in the NAND flash memory 100. At this time, in a case where the logical address LA1 is read, the corresponding physical address is acquired from the logical-physical conversion table of the logical-physical conversion table cache 232 in the table cache 221.

In addition, the "table address in the cache" at a logical address LA2 is "Invalid", the "table address in the NAND" is MRA2, and the "cache hit history information" is "11". In other words, the logical-physical conversion table corresponding to the logical address LA2 is not in the logical-physical conversion table cache 232 in the table cache 221. In addition, the logical-physical conversion table corresponding to the logical address LA2 is in the address MRA2 of the logical-physical conversion table cache 232 of the NAND flash memory 100. At this time, since the "cache hit history information" is "11", in a case where the logical address LA2 is read, the logical-physical conversion table of the logical-physical conversion table storage area 124 in the NAND flash memory 100 is cached in the logical-physical conversion table cache 232 in the table cache 221. Then, the corresponding physical address is acquired from the cached logical-physical conversion table.

In addition, the "table address in the cache" at a logical address LA3 is "Invalid", the "table address in the NAND" is MRA3, and the "cache hit history information" is "01". In other words, the logical-physical conversion table corresponding to the logical address LA3 is not in the logical-physical conversion table cache 232 in the table cache 221. In addition, the logical-physical conversion table corresponding to the logical address LA3 is at the address MRA3 of the logical-physical conversion table cache 232 in the NAND flash memory 100. At this time, since the "cache hit history information" is "01", in a case where the logical address LA3 is read, the logical-physical conversion table of the logical-physical conversion table storage area 124 in the NAND flash memory 100 is not cached in the logical-physical conversion table cache 232 in the table cache 221. Therefore, the corresponding physical address is directly acquired from the logical-physical conversion table of the logical-physical conversion table storage area 124 in the NAND flash memory 100.

Operation of Second Embodiment

First Example of Reading in Second Embodiment

Figure 18:
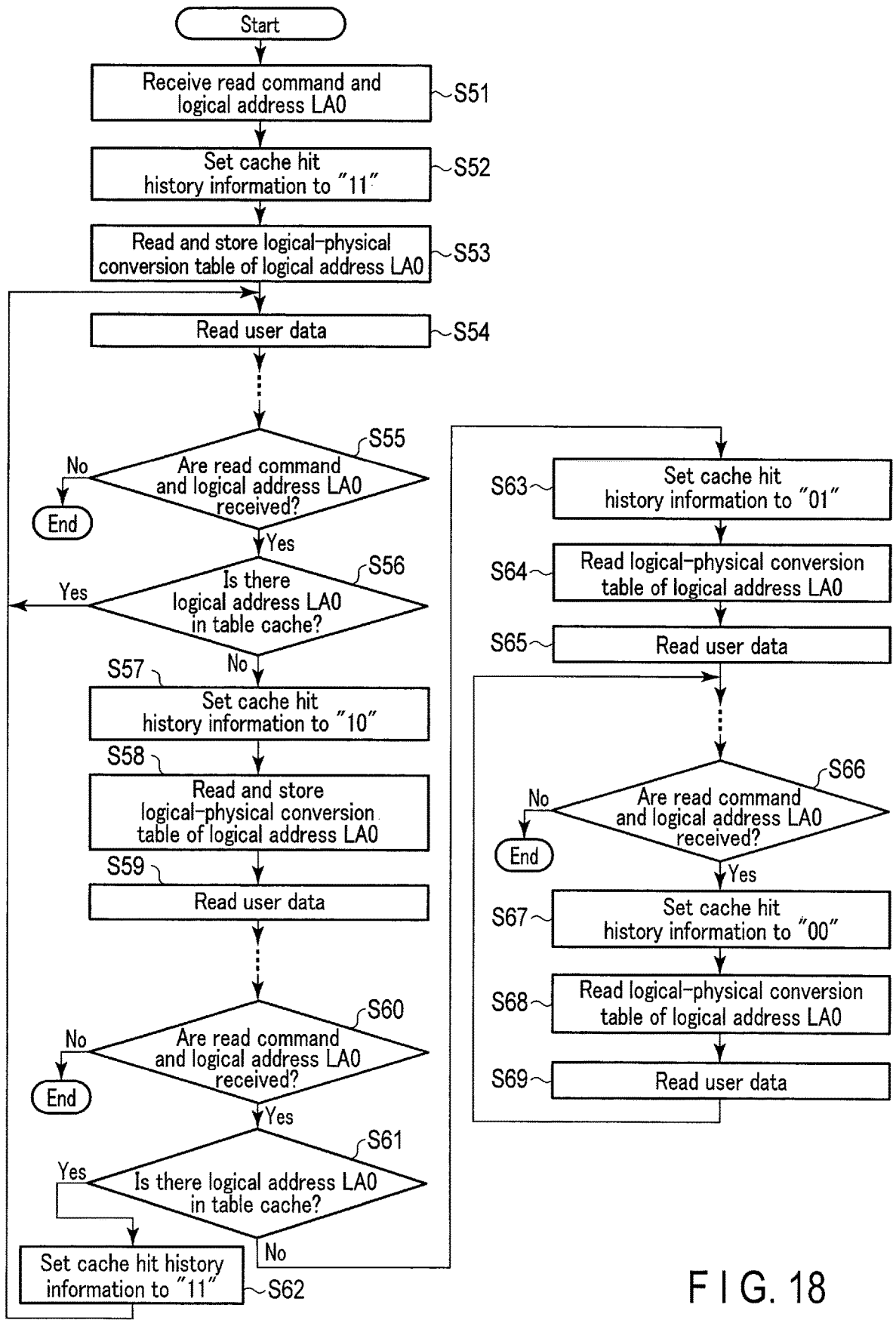
FIG. 18 is a flowchart illustrating a first example of the reading in the memory system according to the second embodiment.

FIG. 18 is a flowchart illustrating a first example of the reading in the memory system according to the second embodiment 300.

In the first example, it is determined whether the logical-physical conversion table corresponding to the target logical address is in the table cache 221 at the time of reading. The cache hit history information is updated according to the result. Then, whether the target logical address is related to a local access is determined according to the value of the cache hit history information. In a case where it is determined that there is no local access, caching the logical-physical conversion table from the NAND flash memory 100 to the table cache 221 is suppressed. The detailed description will be given below.

As illustrated in FIG. 18, in the first example, first, the processor 211 receives a read command and the logical address LA0 from a host 400 in Step S51.

Next, in Step S52, the processor 211 sets the cache hit history information to "11" as an initial state.

Next, in Step S53, the processor 211 reads the logical-physical conversion table corresponding to the received logical address LA0 from the NAND flash memory 100. At this time, since the cache hit history information is "11", the processor 211 caches the read logical-physical conversion table in the table cache 221.

Next, in Step S54, the processor 211 reads user data from the NAND flash memory 100. More specifically, the processor 211 acquires the physical address from the logical-physical conversion table cached in the table cache 221, and reads the user data from the NAND flash memory 100 on the basis of the acquired physical address.

Thereafter, some operations are performed. Through those operations, the logical-physical conversion table of the logical address LA0 cached in the table cache 221 may be ejected.

Next, in a case where the processor 211 receives the read command and the logical address LA0 again from the host 400 in Step S55, the processor 211 determines whether a logical-physical conversion table of the logical address LA0 is in the table cache 221 in Step S56.

In a case where it is determined in Step S56 that the logical-physical conversion table of the logical address LA0 is in the table cache 221 (i.e., a case where the "table address in the cache" is CRA), the processor 211 reads the user data in Step S54. In other words, the processor 211 acquires the physical address from the logical-physical conversion table cached in the table cache 221, and reads the user data from the NAND flash memory 100 on the basis of the acquired physical address.

In a case where it is determined in Step S56 that the logical-physical conversion table of the logical address LA0 is not in the table cache 221 (i.e., in a case where the "table address in the cache" is "Invalid"), the processor 211 sets the cache hit history information to "10" in Step S57.

Next, in Step S58, the processor 211 reads the logical-physical conversion table corresponding to the received logical address LA0 from the NAND flash memory 100. At this time, since the cache hit history information is "10", the processor 211 caches the read logical-physical conversion table in the table cache 221.

Next, in Step S59, the processor 211 reads the user data from the NAND flash memory 100. More specifically, the processor 211 acquires the physical address from the logical-physical conversion table cached in the table cache 221, and reads the user data from the NAND flash memory 100 on the basis of the acquired physical address.

Thereafter, some operations are performed. Through those operations, the logical-physical conversion table of the logical address LA0 cached in the table cache 221 may be ejected.

Next, in a case where the processor 211 receives the read command and the logical address LA0 again from the host 400 in Step S60, the processor 211 determines whether a logical-physical conversion table of the logical address LA0 is in the table cache 221 in Step S61.

In a case where it is determined in Step S61 that the logical-physical conversion table of the logical address LA0 is in the table cache 221, the processor 211 sets the cache hit history information to "11" in Step S62. When the cache hit history information is set to "11" in Step S62, the user data is read on the basis of the logical-physical conversion table cached in the table cache 221 in Step S54.

In a case where it is determined in Step S61 that the logical-physical conversion table of the logical address LA0 is not in the table cache 221, the processor 211 sets the cache hit history information to "01" in Step S63. In other words, the cache hit history information is set to the second value indicating a non-cache target from the first value indicating a cache target.

Next, in Step S64, the processor 211 reads the logical-physical conversion table corresponding to the received logical address LA0 from the NAND flash memory 100. At this time, since the cache hit history information is "01", the processor 211 does not cache the read logical-physical conversion table in the table cache 221 unlike to the cases of "11" and "10".

Next, in Step S65, the processor 211 reads the user data from the NAND flash memory 100. More specifically, the processor 211 acquires the physical address from the logical-physical conversion table read from the NAND flash memory 100, and reads the user data from the NAND flash memory 100 on the basis of the acquired physical address.

When the processor 211 receives the read command and the logical address LA0 again from the host 400 in Step S66, the processor 211 sets the cache hit history information to "00" in Step S67.

Next, in Step S68, the processor 211 reads the logical-physical conversion table corresponding to the received logical address LA0 from the NAND flash memory 100. At this time, since the cache hit history information is "00", the processor 211 does not cache the read logical-physical conversion table in the table cache 221.

Next, in Step S69, the processor 211 reads the user data from the NAND flash memory 100. More specifically, the processor 211 acquires the physical address from the logical-physical conversion table read stored in the NAND flash memory 100, and reads the user data from the NAND flash memory 100 on the basis of the acquired physical address.

Thereafter, when the processor 211 receives the read command and the logical address LA0 again from the host 400 in Step S66, the similar operations are repeatedly performed.

Second Example of Reading in Second Embodiment

Figure 19:
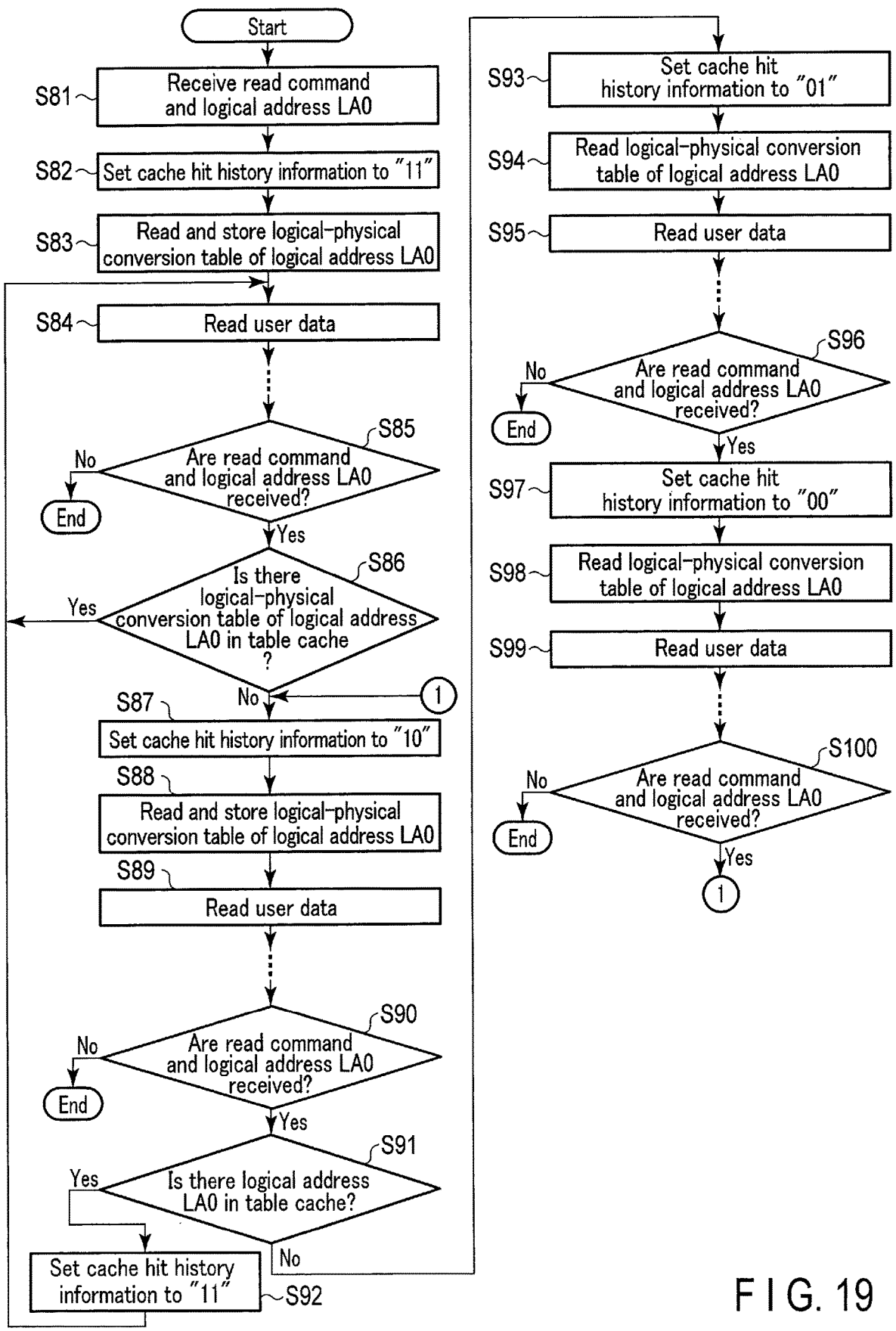
FIG. 19 is a flowchart illustrating a second example of the reading in the memory system according to the second embodiment.

FIG. 19 is a flowchart illustrating the second example of the reading in the memory system according to the second embodiment 300.

In the second example, even in a case where the cache hit history information is "01" indicating a non-cache target, the processor 211 sets the cache hit history information to "10" indicating a cache target when two read accesses are performed. The detailed description will be given below.

As illustrated in FIG. 19, the operations in Steps S81 to S99 of the second example are similar to those in Steps S51 to S69 of the first example.

Thereafter, some operations are performed.

When the processor 211 receives the read command and the logical address LA0 again from the host 400 in Step S100, the processor 211 sets the cache hit history information to "10" in Step S87. In other words, the cache hit history information is set to the first value indicating a cache target from the second value indicating a non-cache target.

In other words, in the second example, even in a case where the cache hit history information becomes "01" indicating a non-cache target, the cache hit history information is changed to indicate a cache target rather than a non-cache target when two read accesses (Steps S96 and S100) are performed.

Third Example of Reading in Second Embodiment

Figure 20:
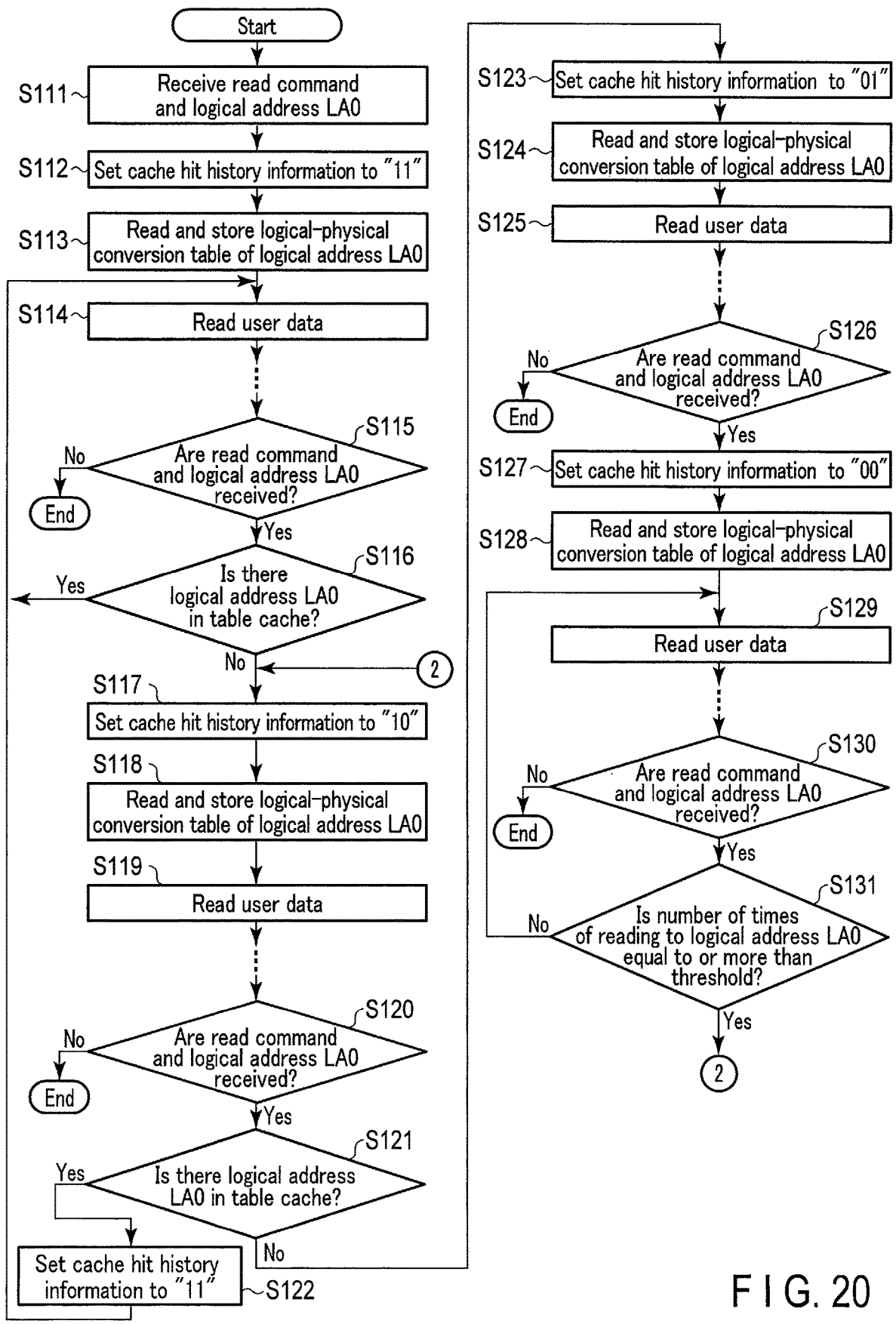
FIG. 20 is a flowchart illustrating a third example of the reading in the memory system according to the second embodiment.

FIG. 20 is a flowchart illustrating a third example of the reading in the memory system according to the second embodiment 300.

In the third example, even in a case where the cache hit history information is "01" indicating a non-cache target, the cache hit history information is changed to be "10" indicating a cache target when a predetermined times of read accesses are performed. The detailed description will be given below.

As illustrated in FIG. 20, the operations in Steps S111 to S129 of the third example are similar to those in Steps S51 to S69 of the first example.

Thereafter, some operations are performed.

When the processor 211 receives the read command and the logical address LA0 again from the host 400 in Step S130, the processor 211 determines whether the number of times of reading to the logical address LA0 is equal to or more than a threshold in Step S131.

In a case where it is determined in Step S131 that the number of times of reading is less than the threshold, the processor 211 reads the user data from the NAND flash memory 100 in Step S129. More specifically, the processor 211 acquires the physical address from the logical-physical conversion table read from the NAND flash memory 100, and reads the user data from the NAND flash memory 100 on the basis of the acquired physical address.

In a case where it is determined in Step S131 that the number of times of reading is equal to or more than the threshold, the processor 211 sets the cache hit history information to "10" in Step S117. In other words, the cache hit history information is set to the first value indicating a cache target from the second value indicating a non-cache target.

In other words, in the third example, even in a case where the cache hit history information becomes "01" indicating a non-cache target, the cache hit history information is changed to indicate a cache target rather than a non-cache target when a predetermined number of times of read accesses (Steps S126 and S130) are performed.

Effects of Second Embodiment

Since the capacity of the table cache 221 is small in the memory system 300, only a part of the logical-physical conversion table stored in the NAND flash memory 100 can be cached. Therefore, the logical-physical conversion table in the table cache 221 is appropriately replaced. At this time, the logical-physical conversion table corresponding to a logical address having a low access frequency of the reading (for example, a logical address read only one time) is also cached in the table cache 221. In this way, even if the logical-physical conversion table having a low access frequency is cached in the table cache 221, the cached logical-physical conversion table is less used thereafter, and a utilization efficiency of the table cache 221 is degraded.

With this regard, in the second embodiment, it is determined whether a logical-physical conversion table corresponding to the target logical address is in the table cache 221 at the time of reading. Therefore, the cache hit history information is updated according to the determination result. Then, the local access to the target logical address is determined according to the value of the cache hit history information (i.e., whether the access frequency is high). As a result, in a case where the access frequency is determined to be low, the logical-physical conversion table is not cached from the NAND flash memory 100 to the table cache 221. In a case where the access frequency is determined to be high, the logical-physical conversion table is cached from the NAND flash memory 100 to the table cache 221. Therefore, the table cache 221 can efficiently cache the logical-physical conversion table of the logical address of which the access frequency is determined to be high.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system, comprising:
a non-volatile memory;
a first memory and a second memory; and
a memory controller configured to
receive a first logical address from a host in a first reading,
read a first address conversion table corresponding to the first logical address from the non-volatile memory,
store, in the non-volatile memory, a second address conversion table of a first state stored in the first memory in a case where the first logical address corresponds to a second logical address stored in the second memory, and
in a case where the first logical address does not correspond to the second logical address,
store a third logical address in the second memory, the third logical address corresponding to a third address conversion table of a second state stored in the first memory,
erase the third address conversion table from the first memory, and
store the first address conversion table in the first memory.

2. The memory system of claim 1, wherein
the memory controller is further configured to,
after the second address conversion table is stored in the non-volatile memory,
erase the second address conversion table from the first memory and store the first address conversion table in the first memory.

3. The memory system of claim 1, wherein
the first state indicates a state in which a content of a corresponding address conversion table stored in the first memory is different from a content of the corresponding address conversion table stored in the non-volatile memory.

4. The memory system of claim 1, wherein
the second state indicates a state in which a content of a corresponding address conversion table stored in the first memory is not different from a content of the corresponding address conversion table stored in the non-volatile memory.

5. The memory system of claim 1, wherein
the second logical address stored in the second memory indicates a local access target address.

6. A memory system, comprising:
a non-volatile memory;
a first memory and a second memory, and
a memory controller configured to
   receive a first logical address from a host in a first reading,
   read a first address conversion table corresponding to the first logical address from the non-volatile memory, and
   store, in the non-volatile memory, a second address conversion table of a first state stored in the first memory in a case where the first logical address corresponds to a second logical address stored in the second memory,
wherein, at a time of a second reading before the first reading, a fourth address conversion table corresponding to the second logical address is erased from the first memory, and the second logical address is stored in the second memory.

* * * * *